CRYOTRON SHIFT REGISTER
Filed May 29, 1961
FIG. 1
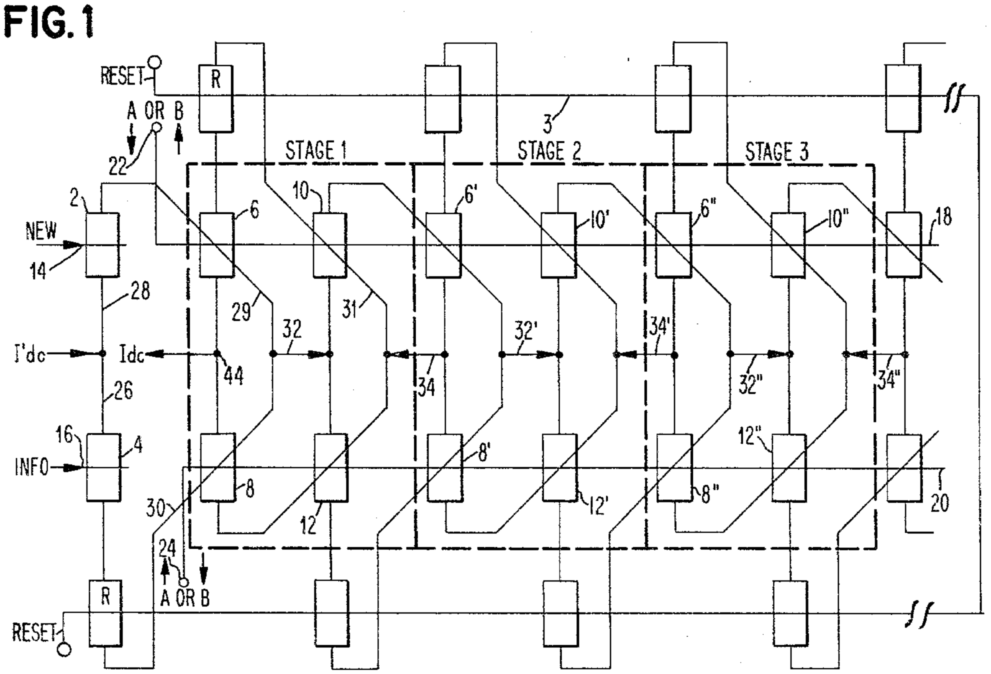
FIG. 2
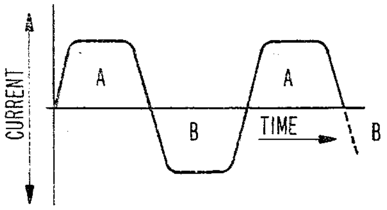
FIG. 3
| RELATIVE AMPLITUDES OF SHIFT REGISTER CURRENTS | |
|---|---|
| I'dc | 1/2 UNIT CURRENT |
| I dc | 1/2 UNIT CURRENT |
| A PULSE | 1/2 UNIT CURRENT |
| B PULSE | 1/2 UNIT CURRENT |
| MINIMUM CURRENT TO SWITCH A GATE 6,8,10,12,ETC | GREATER THAN 1/2 UNIT CURRENT |
FIG. 4
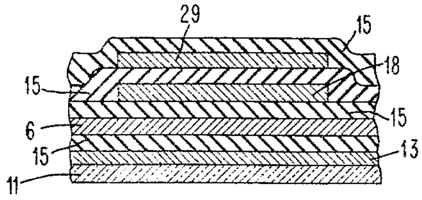
INVENTOR
JAMES P. BEESLEY
BY George Baron
ATTORNEY

United States Patent Office 3,185,862
Patented May 25, 1965

3,185,862

CRYOTRON SHIFT REGISTER

James P. Beesley, Poughkeepsie, N.Y., assignor to International Business Machines Corporation, New York, N.Y., a corporation of New York Filed May 29, 1961, Ser. No. 113,408
3 Claims. (Cl. 307—88.5)

The present invention relates to superconductive devices and more particularly to such devices which are employed as shift registers.

Shift registers generally include a number of identical stages connected together in serial fashion. Each stage has a storage device and the stages are interconnected by transfer or coupling circuits. Information entered into one or more of the storage devices is advanced in step-by-step fashion along the chain in response to a series of shift pulses. In some shift registers it is customary to employ flip-flops as the storage elements. In superconductive shift registers, flip-flop circuits utilize cryotrons which are superconductive switching elements and each element comprises a superconductive straight wire surrounded by a coil whose magnetic field controls the superconductive properties of the straight wire. Such cryotrons may be formed employing thin films wherein the straight wire and control coil are made of vacuum-deposited thin films of superconductive material deposited on a suitable substrate.

The cryogenic shift register shown and described herein includes six cryotrons per stage, said cryotrons being formed preferably by vacuum deposition of thin films. An input cryogenic flip-flop receives the binary bit of information. The entry of information into the flip-flop causes one gate of the flip-flop to go resistive, diverting a D.C. current from a first path to a second path of such input flip-flop. Two gates of each stage form a permanent storage of binary information and two gates of the same stage form a temporary storage of such information. Each cryogenic storage element consists of two alternate paths for the flow of D.C. current. If the current flows through one path, a "1" is stored, if through the alternate path, a "0" is stored. The stored current makes a partial selection of those gates which control the flow of D.C. current in the following storage element. Two cryotrons are coupled to each stage to permit reset of the register.

Shift lines are employed for stepping the information stored in one stage to the next stage. The shift lines are so arranged that the stepping of information is accomplished by the application of a sine wave or pulses of alternating polarity to such shift lines. The shift line acts as an additional control line for all the cryotron gates in the register. Positive pulses applied to the shift lines will be additive to the current in the D.C. controls for one set of gates but in opposition to the D.C. controls for another set of gates. Negative pulses will have the converse effect. Consequently the shifting of information through a register can be accomplished using bipolar driving pulses. Moreover, as will be explained hereinafter, information can be entered into the register during the application of a drive pulse to the shift lines of the register.

It is an object to provide a cryogenic shift register.

It is another object to provide a cryogenic shift register capable of being operated with bipolar shifting pulses.

It is yet another object to obtain a bipolar cryogenic shift register employing relatively few cryotrons per stage.

The foregoing and other objects, features and advantages of the invention will be apparent from the following more particular description of a preferred embodiment of the invention, as illustrated in the accompanying drawings.

FIG. 1 is a showing in schematic form of the novel shift register.

FIG. 2 represents the current pulses employed as shift pulses in the novel cryogenic shift register.

FIG. 3 sets forth the relative current amplitudes of the shift register.

FIG. 4 is a cross-section, greatly enlarged, of a cryotron employed in the shift register.

In FIG. 1, gate 2 and gate 4 are the gates for storing binary information entering the shift register and gates 6, 8, 10 and 12 form the gates of the first stage of such register, gates 6′, 8′, 10′ and 12′ are the gates of the second register, three full stages being shown, it being understood that as many stages as desired can be employed. Gates R are employed as control gates for resetting the shift register. Gates 10 and 12 of stage 1 and their corresponding gates in the other stages are the temporary storage gates of the shift register whereas gates 6 and 8 and their corresponding gates in other stages store the information after shifting. Obviously, if desired, gates 6 and 8 could be employed as the temporary storage gates with 10 and 12 being designated as the information storage gates.

New information enters the shift register through input lines 14 and 16. Lines 18 and 20 are the shift lines of the register and they carry shift pulses applied simultaneously to their respective input terminals 22 and 24. There are two D.C. paths, namely, $I'_{dc}$ and $I_{dc}$ that traverse the various gates of the shift register, $I'_{dc}$ being the gate current for input gates 2 and 4 and temporary storage gates 10, 12, 10′, 12′, etc. and such current can be traced as it flows from left to right through the shift register. $I_{dc}$ is the gate current for the shift register gates 6, 8, 6′, 8′, etc. $I_{dc}$ travels from right to left through the shift register. The D.C. currents $I'_{dc}$ and $I_{dc}$ may be separate sources or they may emanate from the same source, their origins being immaterial to the spirit of the invention.

After the shift register is place in the correct temperature environment such as liquid helium, $I_{dc}$ and $I'_{dc}$ are applied to the shift register, and such currents divide inversely proportional to the inductances of the parallel paths through which they flow. This is the stage of the virgin shift register prior to entry of information into the register or the resetting of the register. After the application of the D.C. curents, the register is reset by applying a current pulse to reset line 3, such pulse being of sufficient magnitude to drive all the reset cryotrons R resistive. Such resistivity in cryotrons R will cause $I'_{dc}$ to flow through gate 2, 10, 10′, 10″ etc. and current $I_{dc}$ to flow through 8, 8′, 8″, etc. In effect, the clearing of the register sets the temporary and permanent storage gates into their respective "0" states. Gates current $I'_{dc}$ flowing through all the upper temporary storage gates of the register and gate current $I_{dc}$ flowing through all the lower permanent storage gates represents the cleared state of the shift register once a reset pulse has been applied.

In describing the operation of the novel shift register it will be assumed that all currents are measured with respect to a unit current. The total drive current required to switch any of the gates 6, 8, 10 or 12, or their corresponding gates in the shift register from the super-conductive to resistive state, must be greater than ½ unit current. The D.C. currents $I'_{dc}$ and $I_{dc}$ are each ½ unit current. The shift pulses A or B that appear at terminals 22 and 24 each have an amplitude of ½ unit current.

Assume that a bit of information enters the shift register through either input line 14 or 16. By definition, a pulse on line 14 will carry sufficient current to drive gate 2 from its superconductive state to its resistive state. Likewise, a pulse appearing on line 16 would drive gate 4 resistive. In following the operation of the shift register, it will be seen that the driving of gate 2 resistive would divert $I'_{dc}$ current through path 26 through superconductive gate 4. Full $I'_{dc}$ current through gate 4 indicates that the new information entered into the register is a "1". If information enters the register as a current pulse on line 16, then gate 4 is resistive and $I'_{dc}$ passes along path 28 through superconductive gate 2, indicating that a "0" was written into the register.

Assuming that a "1" was entered into the shift register and the remaining stages of the register contained "0's", $I'_{dc}$ would go through gate 4, reset gate R and path 30. Immediately after the information is put into the shift register, shift pulses are applied simultaneously at terminals 22 and 24. The A pulse passes through shift lines 18 and 20 but only the A pulse through shift line 20 is additive to the ½ unit current bias flowing in line 30 to produce a current greater than ½ unit current. The combined effect of current through shift line 20 and bias line 30 is sufficient to drive gate 8 resistive. All of $I_{dc}$ current passes through path 34 and line 31 to bias gate 10 and pass through reset gate R and gate 6 on its way out through terminal 44. The passage of current through gate 6 indicates that the "1" read into the first temporary storage stage of the shift register has been shifted into the first permanent storage stage of the register. As soon as shift pulse A terminates, the negative pulse B is applied simultaneously to both terminals 22 and 24. Gate 10 is now affected by the ½ amplitude current $I_{dc}$ biasing gate 10 and the ½ current amplitude pulse B appearing on shift line 18. The sum of these two ½ currents is sufficient to drive gate 10 resistive which diverts current $I'_{dc}$ through superconductive gate 12. The "1" that was written into the shift register is now stored as a current $I'_{dc}$ flowing through gate 12. It is arbitrary as to whether gates 6 and 8 are chosen to be the gates that are the shift register gates for storing information or whether gates 10 and 12 are the gates for storing the information of the shift register. For an understanding of the invention it is immaterial whether one set of gates be used for temporary storage and the other set be used for permanent storage of the contents of the shift register, so long as there is consistency once a choice has been made.

If desired, the output of the last stage of the shift register can be tied as an input to the first stage of the register to produce a ring counter. Also, if desired, new information can enter the shift register along lines 14 and 16 after the termination of shift pulses A and B, or new information can be entered while shift pulse B is applied at terminals 22 and 24. Since the entry of new information into the register takes place along line 14 or line 16, $I'_{dc}$ current will either pass through gate 2 to apply full bias current to gate 6 or pass through gate 4 to apply full bias current to gate 8, depending upon whether a "0" or a "1" was read into the register. Since a "B" pulse appearing on shift lines 18 and 20 causes a current pulse through such lines to be in opposition to the full bias current being applied to either gate 6 or 8 when new information is read into gate 2 or 4, neither gate 6 or 8 can be affected if information enters the register during the presence of a "B" shift pulse. Thus the novel register described herein permits information to be entered into the register even while the shifting of old information in the register is taking place.

FIG. 4 depicts a preferred embodiment of a cryotron in a stage of the register and its associated circuitry. A suitable substrate such as glass 11 will support all the elements shown in FIG. 1. Through suitable masks, a ground plane 13 of lead of the order of 0.4 to 1.0 micron thick is deposited by vapor deposition techniques onto the glass substrate 11. A layer of silicon monoxide 15 of the same order of thickness is deposited thereon. The gate 6 is tin and of the order of 0.4 to 1.0 micron thick can be made to be 50 to 1500 microns wide. After gate 6 has been deposited, a second layer of silicon monoxide 15 is deposited thereon. Path 29, for current $I'_{dc}$, and shift line 18 are deposited as thin films of lead of the order of 0.5 to 1.0 micron thick and are 12.5 to 250.0 microns wide. A final layer of silicon monoxide is deposited over control lines 18 and 29. Obviously other superconductive materials, insulators and film thicknesses can be employed in the construction of this shift register.

Although the preferred embodiment of the novel shift register employs thin films of superconductive material that are formed by vapor deposition techniques, the nature of the invention is such that the superconductive gates and control lines can be in the form of wires, rods, etchings, and the like without departing from the spirit of that invention.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A shift register comprising a plurality of stages each of which includes four cryotrons, control currents of a first and a second cryotron of a given stage serving as the gate current respectively of a third and a fourth cryotron of the previous stage and control currents of the third and fourth cryotrons of said previous stage serving as the gate current respectively of the first and second cryotrons of said previous stage, a first shift line connected to all the odd cryotrons serving as control lines thereto, a second shift line connected to all the even cryotrons and serving as control lines thereto, means for simultaneously applying bipolar current pulses to said shift lines, wherein current pulses of one polarity are additive to said control currents of the first and second cryotrons but subtractive from said control currents of the third and fourth cryotrons.

2. A shift register for shifting binary information comprising a plurality of stages each of which includes four cryotrons, a first pair of said cryotrons serving as the actual storage of binary information continued in said register and a second pair of said cryotrons serving as the temporary storage of binary information in said register, a source of direct current, said source serving as control currents for the binary information storage cryotrons and gate current for the cryotrons that temporarily store said binary information, a second source of direct current wherein the latter serves as control current for temporary information storage cryotrons and gate current for the actual storage cryotrons, said two direct currents moving in opposite directions through said shift register, and shift lines applied as additional control lines for said cryotrons, said shift lines carrying bipolar current pulses which in one polarity are additive to said control current of the actual information storage cryotrons but are subtractive from said control current of the temporary storage cryotrons, and vice versa in the other polarity.

3. A shift register comprising a plurality of stages each of which includes two pairs of cryotrons, one said pair consisting of first and second cryotrons of the stage and the other pair consisting of third and fourth cryotrons thereof, control currents of said first and said second cryotron of a given stage serving as the gate current respectively of a third and a fourth cryotron of the previous stage and control currents of the third and fourth cryotrons of said previous stage serving as the gate current respectively of said first and second cryotrons of said previous stage, a first shift line connected to all the odd numbered cryotrons and serving to carry control currents thereto, a second shift line connected to all even numbered cryotrons and serving to carry control currents thereto, said shift lines being oriented to carry currents which are additive to control currents of alternate pairs of said cryotrons and subtractive from the others of said control currents when the shift line currents are of a first polarity, and vice versa when said shift line currents are of the opposite polarity.

References Cited by the Examiner

UNITED STATES PATENTS

| | | | |
|---|---|---|---|
| 3,002,111 | 9/61 | Dumin | 307—88.5 |
| 3,019,353 | 1/62 | Mackay | 307—88.5 |
| 3,019,354 | 1/62 | Anderson et al. | 307—88.5 |

GEORGE N. WESTBY, *Primary Examiner.*

ARTHUR GAUSS, *Examiner.*